W. F. MURRAY.
DEVICE FOR PREVENTING WRECKING OF CROSS WIRES OF TROLLEY SYSTEMS.
APPLICATION FILED APR. 1, 1921.
1,388,287.
Patented Aug. 23, 1921.
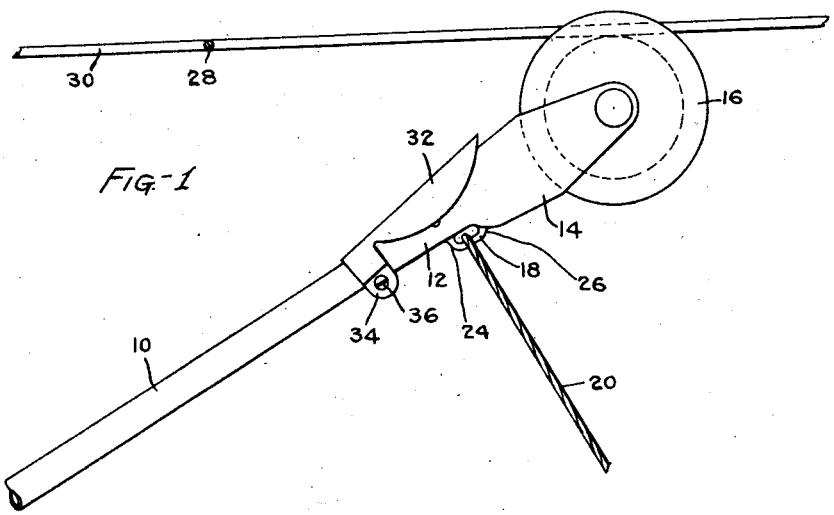
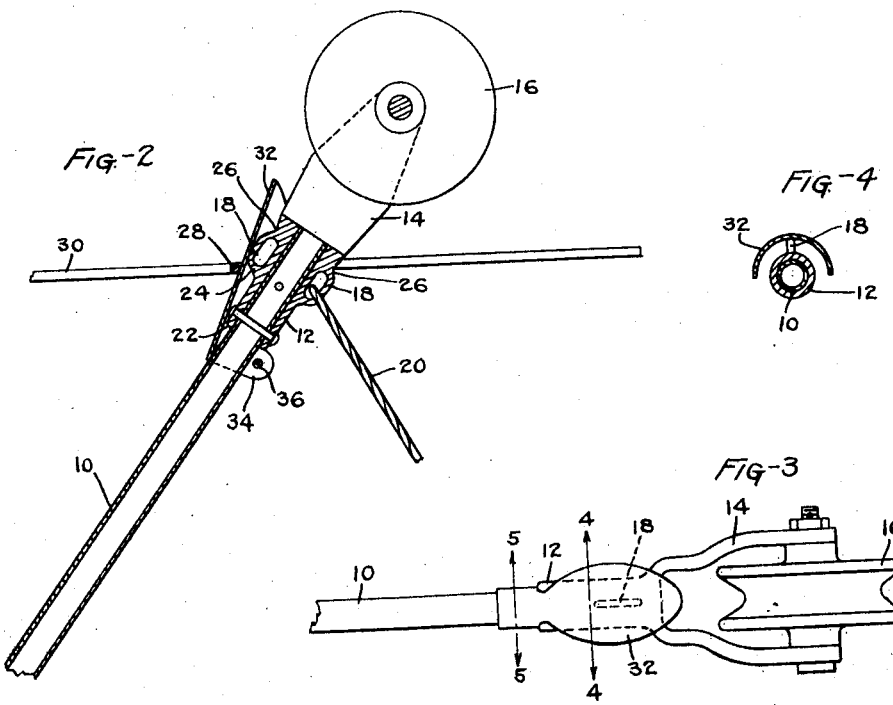
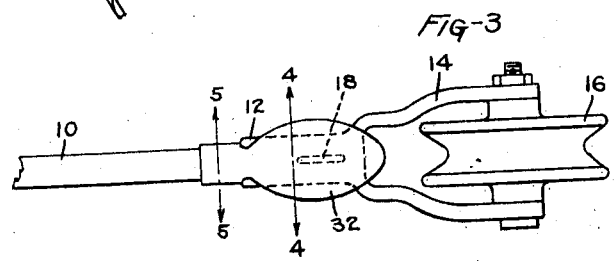
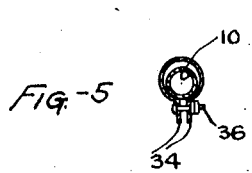
INVENTOR:
W. F. MURRAY.
BY Whiteley and Ruckman
ATTORNEYS.

UNITED STATES PATENT OFFICE.

WILLIAM F. MURRAY, OF MINNEAPOLIS, MINNESOTA.

DEVICE FOR PREVENTING WRECKING OF CROSS-WIRES OF TROLLEY SYSTEMS.

1,388,287.     Specification of Letters Patent.     Patented Aug. 23, 1921.

Application filed April 1, 1921. Serial No. 457,754.

*To all whom it may concern:*

Be it known that I, WILLIAM F. MURRAY, a citizen of the United States, residing at Minneapolis, in the county of Hennepin and State of Minnesota, have invented certain new and useful Improvements in Devices for Preventing Wrecking of Cross-Wires of Trolley Systems, of which the following is a specification.

My invention relates to devices for preventing wrecking of cross-wires of trolley systems. An object of my invention is to provide a shield which may be readily attached to a trolley pole adjacent its head so as to cover the latter and prevent the cross wires being caught and damaged when the trolley pole comes off the trolley wire. I am aware that prior to the time of my invention trolley poles have been provided with scrapers for removing snow and ice from the trolley wires but so far as I am aware none of such devices are effective to accomplish the purpose of my invention.

The full objects and advantages of my invention will appear in connection with the detailed description, and the novel features embodied in my inventive idea will be particularly pointed out in the claim.

In the accompanying drawings,—Figure 1 is a side elevational view of the upper portion of a trolley pole having my device applied thereto. Fig. 2 is a longitudinal sectional view of the upper portion of a trolley pole with my device applied. Fig. 3 is a top plan view. Fig. 4 is a view in cross section on the line 4—4 of Fig. 3. Fig. 5 is a view in cross section on the line 5—5 of Fig. 3.

The drawings show a customary construction of trolley pole having a body member 10 with a head 12 secured thereto in a suitable manner. The head is provided with a fork 14 in which the trolley wheel 16 is mounted and this head is provided with eyes 18 on opposite sides to one or the other of which the trolley cord 20 is attached. This construction results in the formation of a ledge 22, a second ledge 24 and a depression 26 as best shown in Fig. 2. The cross wires 28 which support the trolley wire 30 frequently catch on these ledges or in this depression when the trolley pole comes off the trolley wire, resulting in wrecking the cross-wires. My invention consists in providing a transversely curved shield 32 having at its lower end a pair of enveloping ears 34 which by means of a bolt 36 passed therethrough secure the device upon the trolley pole at a place just below the ledge 22.

The operation and advantages of my invention will be apparent from the foregoing description. The shield provides a smooth surface which on the upper side of the pole covers the ledges 22 and 24 and the depression 26 so that if the pole comes off the trolley wire, the head of the trolley pole will pass the cross wires without damaging them. My device may be easily constructed and readily applied to the pole according to which side thereof is uppermost, and when the pole is reversed to bring the other side uppermost, the shield may be quickly turned in order to cover the uppermost side upon loosening the bolt 36.

I claim:

A device for preventing wrecking of cross wires of trolley systems comprising a transversely curved shield, a pair of enveloping ears at one end of said shield, and means for securing said ears around a trolley pole adjacent its head in such manner that said shield may be moved to cover said head according to which of the opposite sides of the latter is uppermost.

In testimony whereof I hereunto affix my signature.

WILLIAM F. MURRAY.